(12) United States Patent
Ehrlich et al.

(10) Patent No.: US 8,220,817 B2
(45) Date of Patent: Jul. 17, 2012

(54) SEMI-TRAILER FOR TRANSPORTING CIRCULAR OBJECTS

(75) Inventors: Rodney P. Ehrlich, Monticello, IN (US); Andrzej Wylezinski, Lafayette, IN (US); David P. Kunkel, Lebanon, IN (US); Michael Lee Brown, Oxford, IN (US)

(73) Assignee: Wabash National, L. P., Lafayette, IN (US)

( * ) Notice: Subject to any disclaimer, the term of this patent is extended or adjusted under 35 U.S.C. 154(b) by 113 days.

(21) Appl. No.: 12/816,740

(22) Filed: Jun. 16, 2010

(65) Prior Publication Data

US 2010/0320729 A1  Dec. 23, 2010

Related U.S. Application Data

(60) Provisional application No. 61/218,834, filed on Jun. 19, 2009.

(51) Int. Cl.
*B62D 53/06* (2006.01)
(52) U.S. Cl. ................................. 280/423.1
(58) Field of Classification Search ............... 280/423.1; 410/49, 24.5, 426, 36, 40, 47, 42
See application file for complete search history.

(56) References Cited

U.S. PATENT DOCUMENTS

| | | | | | |
|---|---|---|---|---|---|
| 2,810,602 | A | * | 10/1957 | Abrams | 410/42 |
| 3,061,255 | A | * | 10/1962 | Gallo et al. | 410/48 |
| 3,291,073 | A | * | 12/1966 | James | 410/49 |
| 3,322,457 | A | | 5/1967 | Toadvine | |
| 3,323,838 | A | * | 6/1967 | Trucco et al. | 298/8 R |
| 4,411,572 | A | * | 10/1983 | Hostetler | 414/24.5 |
| 4,784,546 | A | * | 11/1988 | Johnson | 410/49 |
| 5,048,885 | A | * | 9/1991 | Bomar | 296/6 |
| 5,170,717 | A | * | 12/1992 | Richmond et al. | 105/377.09 |
| 5,336,027 | A | * | 8/1994 | Paddock | 410/49 |
| 5,343,813 | A | * | 9/1994 | Septer | 105/355 |
| 5,401,129 | A | * | 3/1995 | Eatinger | 410/49 |
| 5,902,087 | A | * | 5/1999 | Dunn | 414/24.5 |
| 6,532,718 | B2 | | 3/2003 | Rayman | |
| 6,923,608 | B2 | * | 8/2005 | Rediehs | 410/49 |
| 8,061,942 | B2 | * | 11/2011 | Fennell | 410/47 |
| 2005/0226697 | A1 | * | 10/2005 | Rediehs | 410/49 |

* cited by examiner

*Primary Examiner* — Tashiana Adams

(57) ABSTRACT

A semi-trailer for transporting circular objects may include a coupler assembly configured to be connected to a towing vehicle, a rear frame member, a pair of side rails joined at rear ends thereof by the rear frame member and at front ends thereof by the coupler assembly, a rear wheel and axle assembly mounted to the side rails between the front and rear ends thereof and at least one transportation well mounted to and between the side rails. The at least one transportation well may extend below the side rails. The at least one transportation well is configured to receive and hold therein while being transported by the semi-trailer at least one circular object.

30 Claims, 4 Drawing Sheets

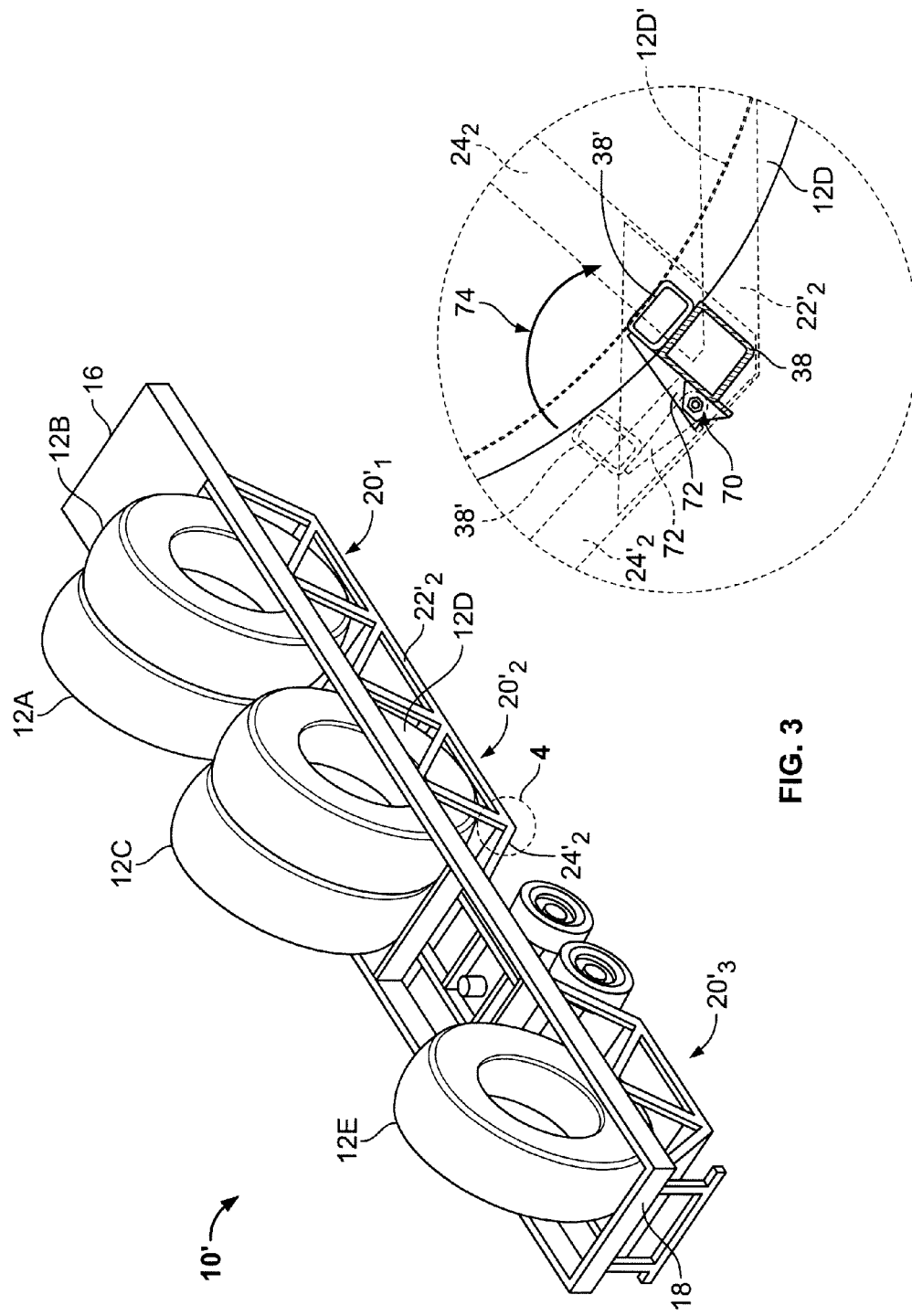

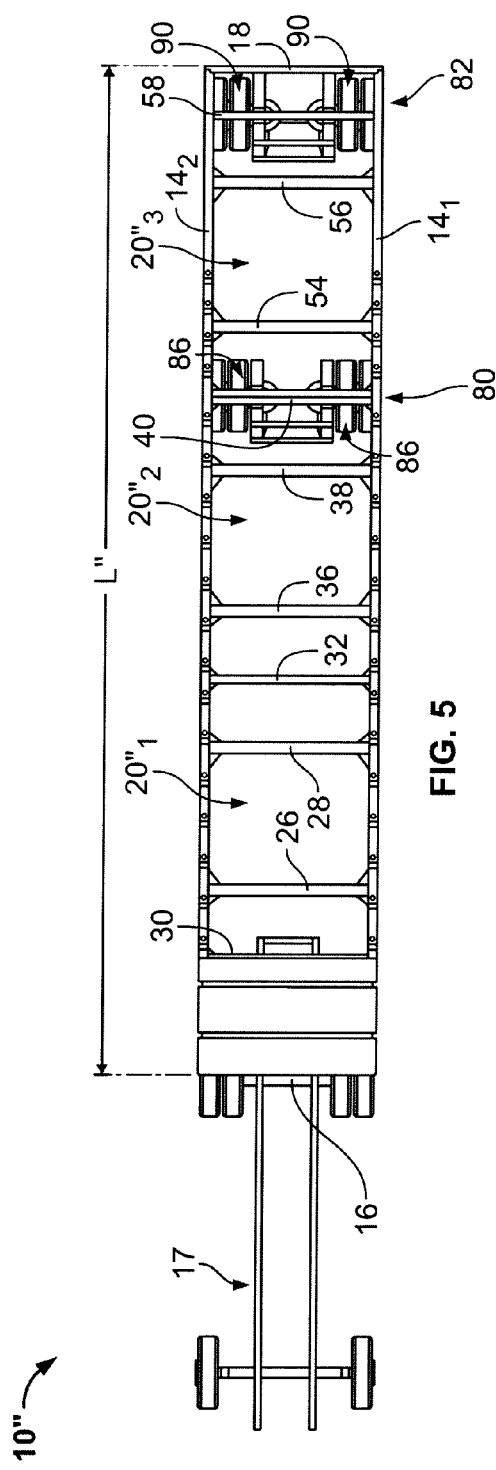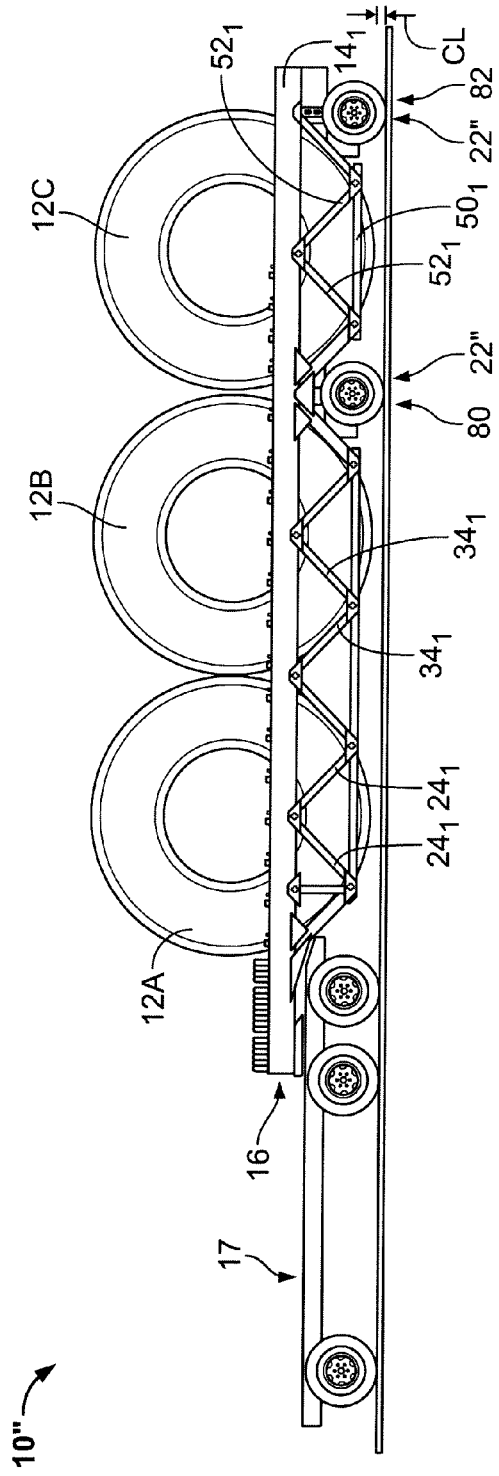

SEMI-TRAILER FOR TRANSPORTING CIRCULAR OBJECTS

This application claims priority under 35 U.S.C. §119(e) to U.S. Provisional Patent Application Ser. No. 61/218,834 filed Jun. 19, 2009 entitled SEMI-TRAILER FOR TRANSPORTING CIRCULAR OBJECTS, the entirety of which is hereby incorporated by reference herein.

FIELD OF THE INVENTION

The present invention relates generally to semi-trailers, and more specifically to semi-trailers configured to transport large, circular objects such as, for example, but not limited to tires, coiled objects, rolled objects and the like.

BACKGROUND

Conventional semi-trailers for transporting objects exist in many forms. It is desirable to provide semi-trailers configured to transport circular objects generally, and large circular objects in particular.

SUMMARY

The present invention may comprise one or more of the features recited in the attached claims, and/or one or more of the following features and combinations thereof. A semi-trailer for transporting circular objects may comprise a coupler assembly configured to be connected to a towing vehicle, a rear frame member, a pair of side rails joined at rear ends thereof by the rear frame member and at front ends thereof by the coupler assembly, a rear wheel and axle assembly mounted to the side rails between the front and rear ends thereof, and at least one transportation well mounted to and between the side rails and extending below the side rails. The at least one tire well may be configured to receive and hold therein while being transported by the semi-trailer at least one circular object.

The at least one transportation well may be configured to receive and hold a single circular object therein. Alternatively or additionally, the at least one transportation well may be configured to receive and hold a plurality of circular objects therein. In any case, the at least one transportation well may be mounted to the side rails between the coupler assembly and the rear wheel and axle assembly. Alternatively or additionally, the at least one transportation well may be mounted to the side rails between the rear wheel and axle assembly and the rear frame member.

In one illustrative embodiment, the at least one circular object may be a tire. In this embodiment, the at least one transportation well may comprise at least one tire well configured to hold therein while being transported by the semi-trailer the at least one tire in standing position with an axis of rotation of the at least one tire perpendicular to the side rails.

The at least one tire well may be mounted to the side rails between the coupler assembly and the rear wheel and axle assembly. In this illustrative embodiment, the semi-trailer may further comprise a first tire stop member mounted to and between the side rails adjacent to a front end of the at least one tire well, and a second tire stop member mounted to and between the side rails adjacent to a rear end of the at least one tire well. The first tire stop member may be configured to provide a barrier to forward movement of the at least one tire during transport of the at least one tire by the semi-trailer, and the second tire stop member may be configured to provide a barrier to rearward movement of the at least one tire during transport of the at least one tire by the semi-trailer.

Illustratively, the at least one tire well may comprise a first tire well mounted to the side rails between the coupler assembly and the rear wheel and axle assembly, and a second tire well mounted to the side rails between the first tire well and the rear wheel and axle assembly. The first tire well may be configured to receive and hold therein while being transported by the semi-trailer at least one tire, and the second tire well may be configured to receive and hold therein while being transported by the semi-trailer at least one other tire. In this embodiment, the semi-trailer may further comprise a first tire stop member mounted to and between the side rails adjacent to a front end of the first tire well, a second tire stop member mounted to and between the side rails adjacent to a rear end of the second tire well and a third tire stop member mounted to and between the side rails adjacent to a rear end of the first tire well and a front end of the second tire well. The first tire stop member may be configured to provide a barrier to forward movement of the at least one tire during transport of the at least one tire by the semi-trailer. The second tire stop member may be configured to provide a barrier to rearward movement of the at least one other tire during transport of the at least one other tire by the semi-trailer. The third tire stop member may be configured to provide a barrier to rearward movement of the at least one tire and a barrier to forward movement of the at least one other tire, during transport of the at least one other tire and the at least one other tire by the semi-trailer.

The at least one tire well may be mounted to the side rails between the rear wheel and axle assembly and the rear frame member. In this embodiment, the semi-trailer may further comprise a tire stop member mounted to and between the side rails adjacent to a front end of the at least one tire well. The tire stop member may be configured to provide a barrier to forward movement of the at least one tire during transport of the at least one tire by the semi-trailer. The rear frame member may provide a barrier to rearward movement of the at least one tire during transport of the at least one tire by the semi-trailer.

Illustratively, the rear wheel and axle assembly may include (i) a first portion having a first axle and a first set of tires coupled to the first axle, and (ii) a second portion having a second axle and a second set of tires coupled to the first axle. The first and second portions may be spaced-apart from each other such that the at least one tire well may be mounted to the side rails between the first and second portions of the rear wheel and axle assembly.

The at least one tire well may be configured to receive and hold a single tire therein. Alternatively, the at least one tire well may be configured to receive and hold a plurality of tires therein.

The at least one tire well may comprise first and second lateral tire support members extending across the at least one tire well with a space defined between the first and second lateral tire support members that is sized to receive a treaded surface of the at least one tire therein such that a portion of the treaded surface of the tire extends below the first and second lateral tire support members. At least one of the first and second lateral tire support members may be movably mounted to the at least one tire well such that the size of the space defined between the first and second lateral support members is adjustable to accommodate different tire diameters.

In another illustrative embodiment, the at least one circular object may be a truncated circular object having a circular cross-section. In this embodiment, the at least one transportation well may be configured to hold therein while being transported by the semi-trailer the at least one truncated circular object with a circular cross-section in standing position with an axis of rotation of the at least one truncated circular object having a circular cross-section perpendicular to the side rails.

In one illustrative embodiment, the at least one truncated circular object having a circular cross-section may comprise at least one coiled object. In this embodiment, the at least one transportation well may be configured to hold therein while being transported by the semi-trailer the at least one coiled object in standing position with an axis of rotation of the at least one coiled object perpendicular to the side rails. Alternatively or additionally, the at least one truncated circular object having a circular cross-section may comprise at least one rolled object. In this embodiment, the at least one transportation well may be configured to hold therein while being transported by the semi-trailer the at least one rolled object in standing position with an axis of rotation of the at least one rolled object perpendicular to the side rails.

In any case, the at least one transportation well may illustratively be configured to receive and hold a single truncated circular object having a circular cross-section therein. Alternatively or additionally, the at least one transportation well may be configured to receive and hold a plurality of truncated circular objects having circular cross-section therein. Illustratively, the at least one transportation well may be mounted to the side rails between the coupler assembly and the rear wheel and axle assembly. Alternatively or additionally, the at least one transportation well may be mounted to the side rails between the rear wheel and axle assembly and the rear frame member.

Further illustratively, the rear wheel and axle assembly may include (i) a first portion having a first axle and a first set of tires coupled to the first axle, and (ii) a second portion having a second axle and a second set of tires coupled to the first axle. The first and second portions may be spaced-apart from each other such that the at least one transportation well may be mounted to the side rails between the first and second portions of the rear wheel and axle assembly.

According to another illustrative aspect of the present disclosure, a semi-trailer for transporting circular objects includes a coupler assembly configured to be connected to a towing vehicle, a rear frame member, a pair of side rails jointed at rear ends thereof by the rear frame member and at front ends thereof by the coupler assembly, and a rear wheel and axle assembly mounted to the side rails between the front and rear ends thereof. The rear wheel and axle assembly includes (i) a first portion having a first axle and a first set of tires coupled to the first axle, and (ii) a second portion having a second axle and a second set of tires coupled to the first axle. The first and second portions are spaced-apart from each other. The semi-trailer further includes a first transportation well mounted to and between the side rails and extending below the side rails. The first transportation well is configured to receive and hold therein while being transported by the semi-trailer a first circular object. Illustratively, the first transportation well is positioned between the first and second portions of the rear wheel and axle assembly.

Illustratively, the first transportation well may be configured to receive and hold a single circular object therein. Alternatively, the first transportation well may be configured to receive and hold a plurality of circular objects therein.

Further illustratively, the semi-trailer may also include a second transportation well mounted to the side rails between the coupler assembly and the first portion of the rear wheel and axle assembly. Illustratively, the second transportation well may be configured to receive and hold therein while being transported by the semi-trailer a second circular object. The semi-trailer may also include a third transportation well mounted to the side rails between the second transportation well and the first portion of the rear wheel and axle assembly. Illustratively, the third transportation well may be configured to receive and hold therein while being transported by the semi-trailer a third circular object. The semi-trailer may also include first, second, third, and fourth transportation members spaced-apart from each other and each mounted to and between the side rails of the semi-trailer. Illustratively, the first transportation stop member may be configured to provide a barrier to forward movement of the second circular object during transport of the second circular object by the semi-trailer. The second transportation stop member may be configured (i) to provide a barrier to rearward movement of the second circular object, and (ii) to provide a barrier to forward movement of the third circular object during transport of the second and third circular objects by the semi-trailer. The third transportation stop member may be configured (i) to provide a barrier to rearward movement of the third circular object, and (ii) to provide a barrier to forward movement of the first circular object during transport of the third and first circular objects by the semi-trailer. The fourth transportation stop member may be configured to provide a barrier to rearward movement of the first circular object during transport of the first circular object by the semi-trailer.

According to still another aspect of the present disclosure, a semi-trailer for transporting circular objects includes a coupler assembly configured to be connected to a towing vehicle, a rear frame member, a pair of side rails jointed at rear ends thereof by the rear frame member and at front ends thereof by the coupler assembly, and a rear wheel and axle assembly mounted to the side rails between the front and rear ends thereof. The semi-trailer further includes a first tire well mounted to and between the side rails and extending below the side rails, a second tire well mounted to and between the side rails and extending below the side rails, and a third tire well mounted to and between the side rails and extending below the side rails. Illustratively, the first, second, and third tire wells are each configured to receive and hold therein a respective first, second, and third tire in standing position with an axis of rotation of the first, second, and third, tires perpendicular to the side rails.

In one illustrative embodiment, the first and second tire wells may be positioned between the coupler assembly and the rear wheel and axle assembly. Further, the third tire well may be positioned between the rear wheel and axle assembly and the rear frame member. Illustratively, a length of such an illustrative semi-trailer between the coupler assembly and the rear frame member may be approximately 53 feet.

In another illustrative embodiment, the first and second tire wells may be positioned between the coupler assembly and a first portion of the rear wheel and axle assembly. Further, the third tire well may be positioned between the first portion of the rear wheel and axle assembly and a second portion of the rear wheel and axle assembly. Illustratively, a length of such an illustrative semi-trailer between the coupler assembly and the rear frame member may be approximately 48 feet. Further illustratively, the second portion of the rear wheel and axle assembly may be coupled to the rear frame member.

BRIEF DESCRIPTION OF THE DRAWINGS

FIG. 3 is a perspective view of another illustrative embodiment of a semi-trailer configured to transport large tires.

FIG. 4 is a magnified view of a portion of the semi-trailer of FIG. 3 showing one illustrative embodiment of a tire support member that is movable to accommodate tires of different diameter, the tire support member being shown in a first position (in phantom) and a second position.

FIG. 5 is a top view of another illustrative semi-trailer configured to transport large tires.

FIG. 6 is a side view of the semi-trailer of FIG. 5 showing three tires being carried by the trailer.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
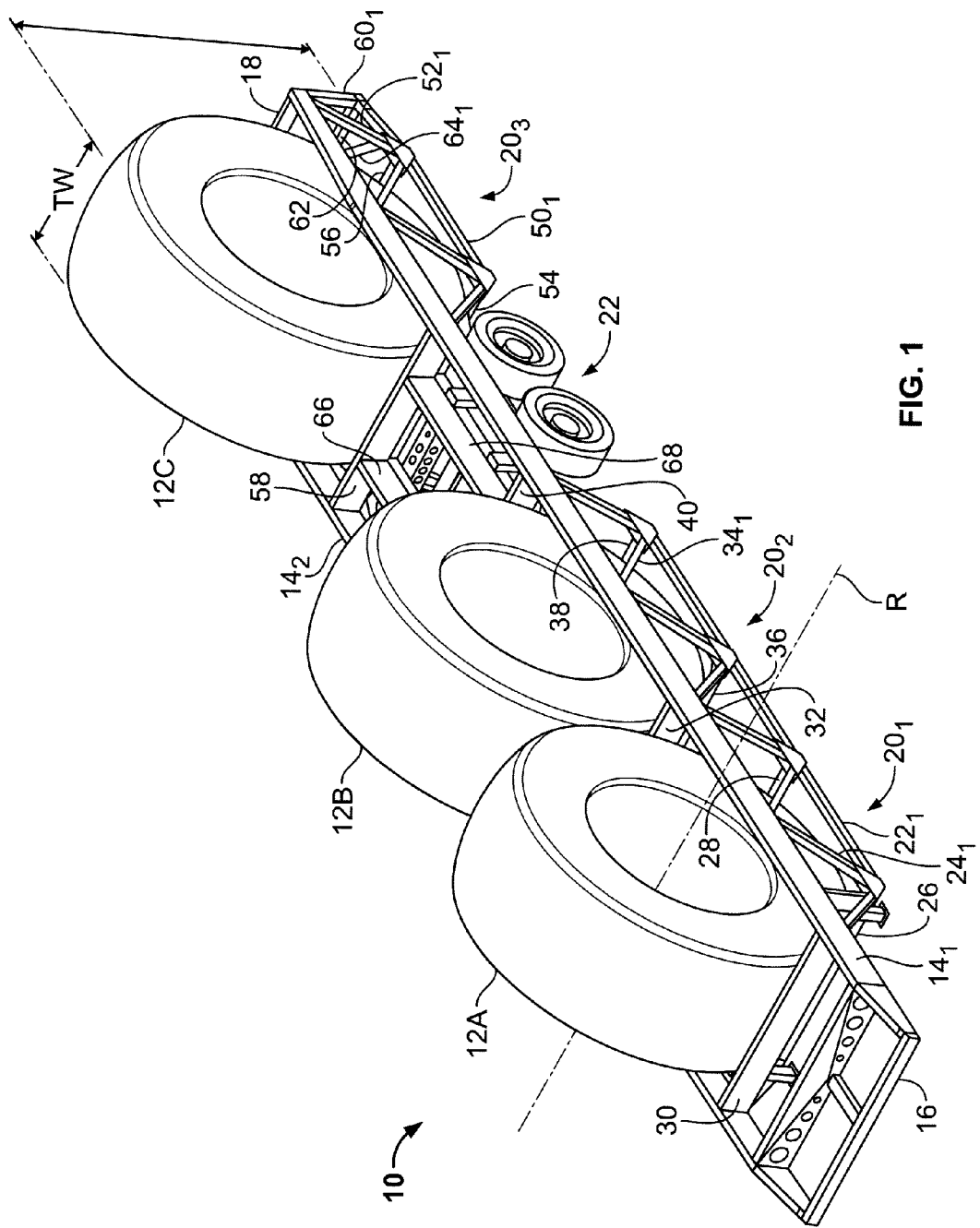
FIG. 1 is a perspective view of one illustrative embodiment of a semi-trailer configured to transport large tires.
Figure 2:
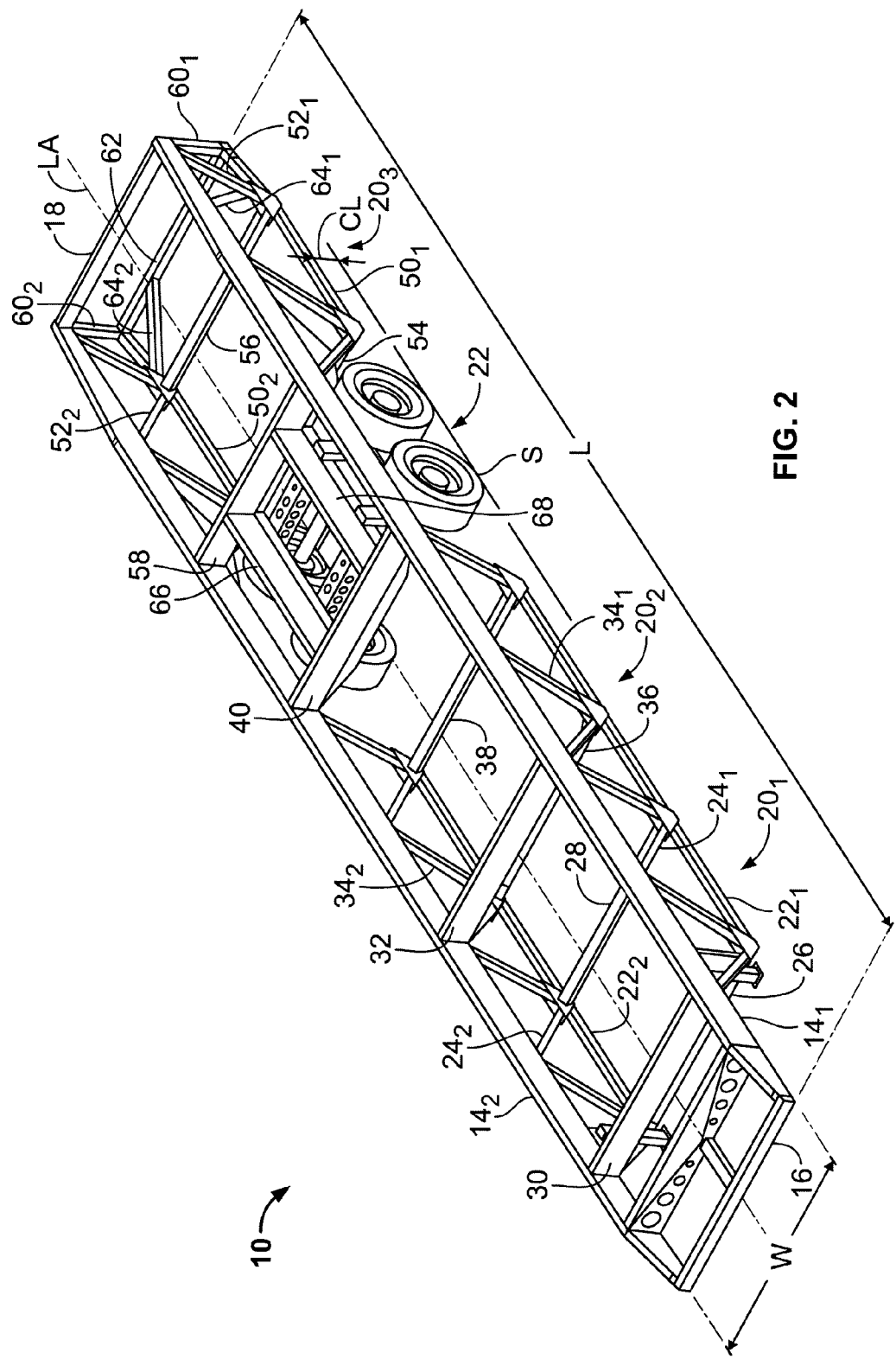
FIG. 2 is a perspective view of the semi-trailer of FIG. 1 shown without the tires being carried by the trailer.

Referring now to FIGS. 1-2, one illustrative embodiment is shown of a semi-trailer 10 configured to transport tires. In the illustrated embodiment, the semi-trailer 10 is shown as being configured to transport three large tires 12A, 12B and 12C, although it will be understood that the semi-trailer 10 may be alternatively configured to transport more or fewer tires of like or other sizes supported by the semi-trailer 10 in the illustrated configuration. The tires 12A, 12B and 12C each define an outer diameter, OD, and a tread width, TW, as illustrated in FIG. 1.

It will be understood that the semi-trailer 10 may generally be configured, as described herein, to haul generally circular objects, and large generally circular objects in particular. It will be understood that the objects may have an open or closed circular, partially circular, oval, partially oval, D-shaped, polygonal, or partial polygonal shape, or may be a truncated structure having an open or closed circular, partially circular, oval, partially oval, D-shaped, polygonal or partially polygonal cross-section. A truncated object having a circular cross-section will be understood to mean that the width of the resulting truncated structure is less than its height, examples of which may include, but should not be limited to, disk-shaped structures, coiled structures, rolled structures, and the like. Any such object shapes will generally be referred to herein as a circular, e.g., a circular object, and it will be understood that "circular object" means any of the foregoing shapes or structures having any of the foregoing cross-sectional shapes. Examples of "circular objects" that fall within this definition include, but are not limited to, large tires as illustrated in the attached figures, coiled objects such as coiled tubing, e.g. drainage tubing, coiled cable or wire, and the like, rolled objects such as rolls of aluminum, steel or the like, and other circular objects.

The semi-trailer 10 defines a pair of opposing side rails $14_1$ and $14_2$ that each extend generally along a length, L, of the semi-trailer 10. At a front end of the semi-trailer 10, the ends of the side rails $14_1$ and $14_2$ are joined by a coupler assembly 16, and at the rear end of the semi-trailer 10, the ends of the side rails $14_1$ and $14_2$ are joined by a rear frame member 18. The coupler assembly 16 is generally configured to be coupled to a towing vehicle 17, an exemplary portion of which is shown in FIGS. 5 and 6. In one illustrative embodiment, for example, the coupler assembly 16 is conventional and is configured to selectively engage and disengage a so-called fifth-wheel of a conventional semi-tractor. The semi-trailer 10 defines a longitudinal axis, LA, that is generally parallel to the side rails $14_1$ and $14_2$, and a width, W, between outer surfaces of the opposing side rails $14_1$ and $14_2$.

The semi-trailer 10 further defines a number of tire wells each configured to receive and retain therein one or more tires for transport. In the illustrated embodiment, for example, the semi-trailer 10 defines three such tire wells $20_1$, $20_2$ and $20_3$ separated by a conventional rear wheel and axle assembly 22, e.g., a so-called "bogey." The tire wells $20_1$, $20_2$ and $20_3$ are each configured to receive the tires 12A, 12B and 12C respectively in a standing position with the axis of rotation, R, of each tire 12 generally perpendicular to the longitudinal axis, LA, of the semi-trailer 10. The tire wells $20_1$, $20_2$ and $20_3$ each extend below the side rails $14_1$, $14_2$, of the coupler assembly 16 and the rear frame member 18 such that the tires 12A, 12B and 12C extend partially below and partially above the side rails $14_1$, $14_2$, the coupler assembly 16 and the rear frame member 18 when being carried by the trailer 10.

The tire well $20_1$ is positioned between the coupler assembly 16 and the tire well $20_2$, the tire well $20_2$ is positioned between the tire well $20_1$ and the rear wheel and axle assembly 22, and the tire well $20_3$ is positioned between the rear wheel and axle assembly 22 and the rear frame member 18. The tire well $20_1$ includes a pair of support frames $22_1$ and $22_2$ extending generally beneath and parallel to a corresponding one of the side rails $14_1$ and $14_2$ respectively. A support structure $24_1$ is attached at a number of locations to the support frame $22_1$ and to the side rail $14_1$. Another support structure $24_2$ is likewise attached at a number of locations to the support frame $22_2$ and to the side rail $14_2$. In the illustrated embodiment, for example, the support structures $24_1$ and $24_2$ are provided in the form of conventional W-trusses connected to the support frames $22_1$ and $22_2$ respectively at two locations and to the side rails $14_1$ and $14_2$ respectively at three locations.

A pair of lateral, elongated tire support members or bars 26 and 28 extend between, and are attached to, the support structures $24_1$ and $24_2$ to form a lower tire support structure of the tire well $20_1$. In the illustrated embodiment, for example, the tire support member or bar 26 extends generally perpendicular between the support frames $22_1$ and $22_2$ adjacent to front connection points of the support structures $24_1$ and $24_2$ with the support frames $22_1$ and $22_2$ respectively of the tire well $20_1$, and the tire support member or bar 28 extends generally perpendicular between the support frames $22_1$ and $22_2$ adjacent to rear connection points of the support structures $24_1$ and $24_2$ with the support frames $22_1$ and $22_2$ respectively of the tire well $20_1$.

A pair of lateral, elongated tire stop members 30 and 32 extend between, and are attached to, the side rails $14_1$ and $14_2$ to form upper, axial tire stop structures of the tire well $20_1$. In the illustrated embodiment, for example, the tire stop member 30 extends generally perpendicular between the side rails $14_1$ and $14_2$ adjacent to front connection points of the support structures $24_1$ and $24_2$ with the corresponding side rails $14_1$ and $14_2$, and the tire stop member 30 extends generally perpendicular between the side rails $14_1$ and $14_2$ adjacent to rear connection points of the support structures $24_1$ and $24_2$ with the corresponding side rails $14_1$ and $14_2$.

In the illustrated embodiment, the support frames $22_1$ and $22_2$ also form support frames of the tire well $20_2$, and a pair of support structures $34_1$ and $34_2$ are attached at a number of locations to the support frame $22_1$ and $22_2$ respectively and to the side rail $14_1$ and $14_2$ respectively. In the illustrated embodiment, for example, the support structures $34_1$ and $34_2$ are identical to the support structures $24_1$ and $24_2$ of the tire well $20_1$, and are provided in the form of conventional W-trusses connected to the support frames $22_1$ and $22_2$ respectively at two locations and to the side rails $14_1$ and $14_2$ respectively at three locations.

A pair of lateral, elongated tire support members or bars 36 and 38 extend between, and are attached to, the support structures $34_1$ and $34_2$ to form a lower tire support structure of the tire well $20_2$. In the illustrated embodiment, for example, the tire support member or bar 36 extends generally perpendicular between the support frames $22_1$ and $22_2$ adjacent to front connection points of the support structures $34_1$ and $34_2$ with the support frames $22_1$ and $22_2$ respectively of the tire well $20_2$, and the tire support member or bar 38 extends generally perpendicular between the support frames $22_1$ and $22_2$ adjacent to rear connection points of the support structures $34_1$ and $34_2$ with the support frames $22_1$ and $22_2$ respectively of the tire well $20_2$.

A lateral, elongated tire stop member 40 extends between, and is attached to, the side rails $14_1$ and $14_2$ to form a rear, upper, axial tire stop structure of the tire well $20_2$. In the illustrated embodiment, for example, the tire stop member 40 extends generally perpendicular between the side rails $14_1$ and $14_2$ adjacent to rear connection points of the support structures $34_1$ and $34_2$ with the corresponding side rails $14_1$ and $14_2$ of the tire well $20_2$. In the illustrated embodiment, the tire stop member 30 forms the front, upper, axial tire stop structure of the tire well $20_2$, although this disclosure contemplates other embodiments that include a front, upper, axial tire stop structure of the tire well $20_2$ that is separate from the tire stop member 30.

The tire well $20_3$ includes a pair of support frames $50_1$ and $50_2$ extending generally beneath and parallel to a corresponding one of the side rails $14_1$ and $14_2$ respectively. Support structures $52_1$ and $52_2$ are attached at a number of locations to the support frame $50_1$ and $50_2$ respectively and to the side rail $14_1$ and $14_2$ respectively. In the illustrated embodiment, for example, the support structures $52_1$ and $52_2$ are identical to the support structures $24_1$ and $24_2$ of the tire well $20_1$, and are provided in the form of conventional W-trusses connected to the support frames $50_1$ and $50_2$ respectively at two locations and to the side rails $14_1$ and $14_2$ respectively at three locations. A bottom frame member 62 extends generally below and parallel with the rear frame member 18, and opposite ends of the bottom frame member 62 and the rear frame member 18 are joined by frame members $60_1$ and $60_2$ respectively. Reinforcing support members $64_1$ and $64_2$ illustratively extend diagonally between the support frames $50_1$ and $50_2$ respectively and the bottom frame member 62.

A pair of lateral, elongated tire support members or bars 54 and 56 extend between, and are attached to, the support structures 5Z and $52_2$ to form a lower tire support structure of the tire well $20_3$. In the illustrated embodiment, for example, the tire support member or bar 54 extends generally perpendicular between the support frames $50_1$ and $50_2$ adjacent to front connection points of the support structures $52_1$ and $52_2$ with the support frames $50_1$ and $50_2$ respectively of the tire well $20_3$, and the tire support member or bar 56 extends generally perpendicular between the support frames $50_1$ and $50_2$ adjacent to rear connection points of the support structures $52_1$ and $52_2$ with the support frames $50_1$ and $50_2$ respectively of the tire well $20_3$.

A lateral, elongated tire stop member 58 extends between, and is attached to, the side rails $14_1$ and $14_2$ to form a front, upper, axial tire stop structure of the tire well $20_3$. In the illustrated embodiment, for example, the tire stop member 58 extends generally perpendicular between the side rails $14_1$ and $14_2$ adjacent to front connection points of the support structures $52_1$ and $52_2$ with the corresponding side rails $14_1$ and $14_2$ of the tire well $20_3$. In the illustrated embodiment, the rear frame member 18 forms the rear, upper, axial tire stop member of the tire well $20_3$, although this disclosure contemplates other embodiments that include a rear, upper, axial tire stop structure of the tire well $20_3$ that is separate from the rear frame member 18. Illustratively, the tire stop members 40 and 58 are joined by axial frame members 66 and 68 to which the rear wheel and axle assembly 22 is mounted.

The lateral tire support members 26 and 28 are positioned relative to the support frames $22_1$ and $22_2$ to create a space between the support members 26 and 28 that is sized to receive a portion of the tire 12A therein and to generally support the tire 12A in a standing position relative to the trailer 10 with the axis of rotation, R, of the tire 12A generally perpendicular to the longitudinal axis, LA, of the trailer 10. The lateral tire support members 36 and 38 are likewise positioned relative to the support frames $22_1$ and $22_2$ to create a space between the support members 36 and 38 that is sized to receive a portion of the tire 12B therein and to generally support the tire 12B in a standing position relative to the trailer 10 with the axis of rotation, R, of the tire 12B generally perpendicular to the longitudinal axis, LA, of the trailer 10, and the lateral tire support members 54 and 56 are positioned relative to the support frames $50_1$ and $50_2$ to create a space between the support members 54 and 56 that is sized to receive a portion of the tire 12C therein and to generally support the tire 12C in a standing position relative to the trailer 10 with the axis of rotation, R, of the tire 12C generally perpendicular to the longitudinal axis, LA, of the trailer 10.

The tire wells $20_1$, $20_2$ and $20_3$ are illustratively configured such that a clearance distance, CL, is defined between the lowest points of the treads of the tires 12A, 12B and 12C and the surface, S, that supports the wheels of the rear wheel and axle assembly 22 when the tires 12A, 12B and 12C are received within the tire wells $20_1$, $20_2$ and $20_3$. The surface, S, is illustrative a road upon which the semi-trailer 10 is traveling or any other surface upon which the semi-trailer 10 is traveling or resting.

In the illustrated embodiment, the tire wells $20_1$, $20_2$ and $20_3$ are each generally configured to receive and hold a single tire, 12A, 12B and 12C respectively, in a standing position, i.e., supported by its treaded surface with its axis of rotation, R, perpendicular to the longitudinal axis, LA, of the semi-trailer 10. In this position, the lower treaded tire surface of the tire 12A is supported by the lateral tire support members 26 and 28, and a portion of the treaded surface of the tire 12A extends through the space defined between the tire support members 26 and 28. The tire stop member 32 illustratively provides a barrier to rearward movement of the tire 12A, and the tire stop member 30 illustratively provides a barrier to forward movement of the tire 12A, when being transported by the semi-trailer 10. The space defined between the tire stop members 30 and 32 is illustratively sized to allow enough forward and rearward movement of the tire 12A so that the tire 12A may be easily loaded into and extracted from the tire well $20_1$, but not enough to allow excessive forward or rearward movement of the tire 12A before contacting the tire stop members 30 and 32 respectively.

In the standing position, the lower treaded tire surface of the tire 12B is likewise supported by the lateral tire support members 36 and 38, and a portion of the treaded surface of the tire 12B extends through the space defined between the tire support members 36 and 38. The tire stop member 32 illustratively provides a barrier to forward movement of the tire 12B, and the tire stop member 40 illustratively provides a barrier to rearward movement of the tire 12B, when being transported by the semi-trailer 10. The space defined between the tire stop members 32 and 40 is illustratively sized to allow enough forward and rearward movement of the tire 12B so that the tire 12B may be easily loaded into and extracted from the tire well 20$_2$, but not enough to allow excessive forward or rearward movement of the tire 12B before contacting the tire stop members 32 and 40 respectively.

The lower treaded tire surface of the tire 12C, in the standing position, is likewise supported by the lateral tire support members 54 and 56, and a portion of the treaded surface of the tire 12C extends through the space defined between the tire support members 54 and 56. The tire stop member 58 illustratively provides a barrier to forward movement of the tire 12C, and the rear frame member 18 illustratively provides a barrier to rearward movement of the tire 12C, when being transported by the semi-trailer 10. The space defined between the tire stop member 58 and the rear frame member 18 is illustratively sized to allow enough forward and rearward movement of the tire 12C so that the tire 12C may be easily loaded into and extracted from the tire well 20$_3$, but not enough to allow excessive forward or rearward movement of the tire 12C before contacting the tire stop member 58 and the rear frame member 18.

The tire wells 20$_1$, 20$_2$ and 20$_3$ are configured to receive and hold tires 12A, 12B and 12C, in standing positions and in a cascade relationship, i.e., one in front of the other with each supported by its treaded surface with its axis of rotation, R, perpendicular to the longitudinal axis, LA, of the semi-trailer 10. In one illustrative embodiment, the tires 12A, 12B and 12C have an outer diameter, OD, of 159 inches and a tread width, TW, of 59 inches. In this embodiment, the semi-trailer 10 illustratively has a length, L, of 636 inches (53 feet) and a width, W, of 102 inches (8.5 feet). The clearance distance, CL, is illustratively 6 inches. It will be understood that these dimensions are provided only by way of example, and that this disclosure contemplates other embodiments in which the tires 12A, 12B and/or 12C and/or semi-trailer 10 have other dimensions, and/or in which the semi-trailer 10 is configured to transport more or fewer tires, and/or in which the tire wells may all be configured to receive and hold a single tire, may all be configured to hold two or more tires, or may include a combination of each.

The tire wells 20$_1$, 20$_2$ and 20$_3$ are illustrated in FIGS. 1 and 2 as being generally configured to receive and hold a single tire, 12A, 12B and 12C respectively, in a standing position, i.e., supported by its treaded surface with its axis of rotation, R, perpendicular to the longitudinal axis, LA, of the semi-trailer 10. Alternatively, any one or more of the tire wells 20$_1$, 20$_2$ and 20$_3$ may be configured to hold more than one tire. In any case, it will be understood that while the wells 20$_1$, 20$_2$ and 20$_3$ are illustrated and described with respect to the attached figures as tire wells, this disclosure contemplates embodiments in which one or more wells may be configured to hold and retain for transportation by the semi-trailer 10 circular objects and/or objects having circular cross-section as these terms have been defined hereinabove. In such cases, the one or more wells may be referred to generally as "transportation wells," such that a tire well represents a subset of transportation wells generally.

Referring now to FIG. 3, a perspective view is shown of another illustrative embodiment of a semi-trailer 10' configured to transport large tires. In the illustrated embodiment, many of the structural features of the trailer 10' are identical to those of the trailer 10 of FIGS. 1 and 2, and descriptions of such features will not be repeated here for brevity. In the embodiment illustrated in FIG. 3, however, the tire wells 20'$_1$ and 20'$_2$ each hold and retain two tires 12A, 12B and 12C, 12D respectively, while the tire well 20'$_3$ holds and retains a single tire 12E, wherein the diameters of the tires 12A-12D are identical and are different than the diameter of the tire 12E.

Referring now to FIG. 4, a magnified view of a portion of the semi-trailer of FIG. 3 is shown illustrating one embodiment of a tire support member 38' that is movable to accommodate tires of different diameter. In the illustrated embodiment, the tire support member 38' is movably mounted, e.g., pivotably mounted, to the support structure 24'$_2$ via a conventional pivoting mechanism 70, and is attached to the pivoting mechanism 70 via an extension piece 72. Illustratively, the extension piece 72 pivotably mounted to the support structure 24'$_2$ adjacent the stationary tire support member 38. The movable tire support member 38' is illustratively coupled to a distal end of the extension piece 72. Although not shown in FIG. 4, the tire support member 38' is likewise movably mounted to the support structure 24'$_1$. As indicated by the arrow 74 in FIG. 4, the tire support member 38' may be moved axially relative to the trailer 10' from a first position (shown in phantom in FIG. 4) to a second position that is forward of the first position. In the first position, the movable tire support member 38' is illustratively spaced-apart from the stationary tire support member 38. Once the extension piece 72 is pivoted in a clockwise direction, however, the movable tire support member 38' is positioned adjacent to and engaged with the tire support member 38 in order to accommodate a tire, such as tire 12D', of a different diameter.

Any one or more, or all, of the tire support members of the trailer 10' may likewise be movably mounted to a corresponding one of the tire wells 20'$_1$, 20'$_2$ and 20'$_3$ and/or may include an additional movable tire support member such that the space defined between corresponding tire support members within any of the tire wells 20'$_1$, 20'$_2$ and 20'$_3$ may be adjusted to accommodate different tire diameters. In other embodiments, the movable mounting structure may include a conventional locking mechanism such that any one or more of the tire support members may be locked in any position between the two extreme positions illustrated in FIG. 4 to provide additional flexibility in the width of the space defined between corresponding tire support members within any of the tire wells 20'$_1$, 20'$_2$ and 20'$_3$. It will further be appreciated that other conventional mechanisms may be used to movably mounting one or more of the tire support members within any of the tire wells 20'$_1$, 20'$_2$ and 20'$_3$, and any such other conventional mechanisms are contemplated by this disclosure.

Looking now to FIGS. 5 and 6, another illustrative embodiment of a semi-trailer 10" configured to transport large tires, such as tires 12A, 12B, and 12C, is shown. In the illustrated embodiment, many of the structural features of the trailer 10" are identical to those of the trailer 10 of FIGS. 1 and 2 as well as the trailer 10' of FIG. 3, and descriptions of such features will not be repeated here for brevity. In the embodiment illustrated in FIGS. 5 and 6, however, the semi-trailer 10" illustratively has a length, L", of 576 inches (48 feet) rather than the length, L, of 636 inches (53 feet) of the semi-trailers 10 and 10'. As is discussed in greater detail below, the semi-trailer 10" includes a modified rear wheel and axle assembly 22" which allows the semi-trailer 10" to have a shorter, 48 foot, length L".

Similar to the trailers 10 and 10', the semi-trailer 10" defines a number of tire wells each configured to receive and retain therein one or more tires for transport. In the illustrated embodiment, for example, the semi-trailer 10" defines three such tire wells 20"$_1$, 20"$_2$ and 20"$_3$. The tire wells 20"$_1$, 20"$_2$ and 20"$_3$ are each configured to receive the tires 12A, 12B and 12C respectively in a standing position with the axis of rotation, R, of each tire 12 generally perpendicular to the longitudinal axis, LA, of the semi-trailer 10". The tire wells 20"$_1$, 20"$_2$ and 20"$_3$ each extend below the side rails 14$_1$,14$_2$, the coupler assembly 16 and the rear frame member 18 such that the tires 12A, 12B and 12C, when positioned in the wells 20"$_1$, 20"$_2$ and 20"$_3$, will extend partially below and partially above the side rails 14$_1$,14$_2$, the coupler assembly 16 and the rear frame member 18 when being carried by the trailer 10", as shown in FIG. 6, for example.

Illustratively, the modified rear wheel and axle assembly 22" includes a first portion 80 and a second portion 82 spaced-apart from the first portion 80. Illustratively, the tire well 20"$_3$ is positioned between the first and second portions 80, 82 of the axle assembly 22". As shown in FIGS. 5 and 6, the first portion 80 of the axle assembly 22" includes a first axle (not shown) and a first set of tires 86 coupled to each end of the axle while the second portion 82 of the axle assembly 22" includes a second axle (not shown) and a second set of tires 90 coupled to each end of the respective axle. Illustratively, the first portion 80 of the axle assembly 22" is mounted to the tire stop 90 of the trailer 10" coupled to and extending between the side rails 14$_1$,14$_2$. Further illustratively, the second portion 82 of the axle assembly 22" is coupled to the tire stop 58 and the rear frame member 18.

The tire well 20"$_1$ is positioned between the coupler assembly 16 and the tire well 20"$_2$, the tire well 20"$_2$ is positioned between the tire well 20"$_1$ and the first portion 80 of the axle assembly 22", and the tire well 20"$_3$ is positioned between the first and second portions 80, 82 of the axle assembly 22". Similar to the tire well 20$_1$ of the trailer 10 shown in FIGS. 1 and 2, the tire well 20"$_1$ includes the pair of support frames 22$_1$ and 22$_2$ extending generally beneath and parallel to a corresponding one of the side rails 14$_1$ and 14$_2$ respectively. The support structure 24$_1$ is attached at a number of locations to the support frame 22$_1$ and to the side rail 14$_1$. Another support structure 24$_2$ is likewise attached at a number of locations to the support frame 22$_2$ and to the side rail 14$_2$. In the illustrated embodiment, for example, the support structures 24$_1$ and 24$_2$ are provided in the form of conventional W-trusses connected to the support frames 22$_1$ and 22$_2$ respectively at two locations and to the side rails 14$_1$ and 14$_2$ respectively at three locations.

Similar to that described above with regard to the trailer 10, the trailer 10" similarly includes the pair of lateral, elongated tire support members or bars 26 and 28 which extend between, and are attached to, the support structures 24$_1$ and 24$_2$ to form the lower tire support structure of the tire well 20"$_1$. The pair of lateral, elongated tire stop members 30 and 32 extend between, and are attached to, the side rails 14$_1$ and 14$_2$ to form the upper, axial tire stop structures of the tire well 20"$_1$. Further, in the illustrated embodiment shown in FIGS. 5 and 6, the support frames 22$_1$ and 22$_2$ also form support frames of the tire well 20"$_2$, and the pair of support structures 34$_1$ and 34$_2$ are attached at a number of locations to the support frame 22$_1$ and 22$_2$ respectively and to the side rail 14$_1$ and 14$_2$ respectively. The pair of lateral, elongated tire support members or bars 36 and 38 extend between, and are attached to, the support structures 34$_1$ and 34$_2$ to form the lower tire support structure of the tire well 20"$_2$. The lateral, elongated tire stop member 40 extends between, and is attached to, the side rails 14$_1$ and 14$_2$ to form the rear, upper, axial tire stop structure of the tire well 20"$_2$. Further, the tire stop member 40 operates to support the front portion 80 of the axle assembly 22". In the illustrated embodiment, the tire stop member 40 forms the front, upper, axial tire stop structure of the tire well 20"$_3$, although this disclosure contemplates other embodiments that include a front, upper, axial tire stop structure of the tire well 20"$_3$ that is separate from the tire stop member 40.

The tire well 20"$_3$ includes the pair of support frames 50$_1$ and 50$_2$ extending generally beneath and parallel to a corresponding one of the side rails 14$_1$ and 14$_2$ respectively. Support structures 52$_1$ and 52$_2$ are attached at a number of locations to the support frame 50$_1$ and 50$_2$ respectively and to the side rail 14$_1$ and 14$_2$ respectively. The pair of lateral, elongated tire support members or bars 54 and 56 extend between, and are attached to, the support structures 52$_1$ and 52$_2$ to form a lower tire support structure of the tire well 20"$_3$. The lateral, elongated tire stop member 58 extends between, and is attached to, the side rails 14$_1$ and 14$_2$ to form the rear, upper, axial tire stop structure of the tire well 20$_3$. As noted above, the second portion 82 of the axle assembly 22" is coupled to the tire support member 58. In the illustrated embodiment, the tire stop member 40 described above as a rear tire stop for the tire well 20"$_2$ forms the front, upper, axial tire stop member of the tire well 20"$_3$, although this disclosure contemplates other embodiments that include a rear, upper, axial tire stop structure of the tire well 20"$_3$ that is separate from the member 40.

In the illustrated embodiment, the tire wells 20"$_1$, 20"$_2$ and 20"$_3$ are each generally configured to receive and hold a single tire, 12A, 12B and 12C respectively, in a standing position, i.e., supported by its treaded surface with its axis of rotation, R, perpendicular to the longitudinal axis, LA, of the semi-trailer 10. Further, the tire wells 20"$_1$, 20"$_2$ and 20"$_3$ are configured to receive and hold tires 12A, 12B and 12C, in standing positions and in a cascade relationship, i.e., one in front of the other with each supported by its treaded surface with its axis of rotation, R, perpendicular to the longitudinal axis, LA, of the semi-trailer 10. As noted above in regard to the trailer 10', in one illustrative embodiment, the tires 12A, 12B and 12C have an outer diameter, OD, of 159 inches and a tread width, TW, of 59 inches. In the embodiment shown in FIGS. 5 and 6, the semi-trailer 10" illustratively has a length, L", of 576 inches (48 feet) and a width, W, of 102 inches (8.5 feet) and is capable of carrying the tires 12A, 12B and 12C having the above-noted illustrative dimensions. Thus, both the trailer 10', having a length L of 53 feet, and the trailer 10", having a length L" of 48 feet, are capable of carrying the above-referenced tires 12A, 12B and 12C. Illustratively, the clearance distance, CL, for both the trailer 10' and the trailer 10" is illustratively 6 inches. It will be understood that these dimensions are provided only by way of example, and that this disclosure contemplates other embodiments in which the tires 12A, 12B and/or 12C and/or semi-trailer 10" have other dimensions, and/or in which the semi-trailer 10" is configured to transport more or fewer tires, and/or in which the tire wells may all be configured to receive and hold a single tire, may all be configured to hold two or more tires, or may include a combination of each.

The tire wells 20"$_1$, 20"$_2$ and 20"$_3$ are illustrated in FIGS. 1 and 2 as being generally configured to receive and hold a single tire, 12A, 12B and 12C respectively, in a standing position, i.e., supported by its treaded surface with its axis of rotation, R, perpendicular to the longitudinal axis, LA, of the semi-trailer 10". Alternatively, any one or more of the tire wells 20"$_1$, 20"$_2$ and 20"$_3$ may be configured to hold more than one tire. In any case, it will be understood that while the wells 20"$_1$, 20"$_2$ and 20"$_3$ are illustrated and described with respect to the attached figures as tire wells, this disclosure contemplates embodiments in which one or more wells may be configured to hold and retain for transportation by the semi-trailer 10" circular objects and/or objects having circular cross-section as these terms have been defined hereinabove. In such cases, the one or more wells may be referred to generally as "transportation wells," such that a tire well represents a subset of transportation wells generally.

It will be understood that while the semi-trailer 10, 10', 10" may be configured to hold, retain and transport circular objects and objects having circular cross-section generally, as these terms are defined herein, the transportation well configuration illustrated and described herein is particularly advantageous for circular objects having a height that is close to or greater than the width, W, of the semi-trailer 10, 10', 10". As illustrated and described herein, such objects may be held, retained and hauled by the semi-trailer 10, 10'. 10" by configuring the one or more transportation wells to hold the circular objects in a standing position such that the height of the circular objects extends vertically upwardly and generally perpendicularly away from the longitudinal axis, LA, of the semi-trailer 10, 10', 10". With such a configuration, it is desirable for the width of any such objects being hauled to be less than or equal to the width, W, of the semi-trailer 10, 10'.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A semi-trailer for transporting circular objects, comprising:
   a coupler assembly configured to be connected to a towing vehicle,
   a rear frame member,
   a pair of side rails joined at rear ends thereof by the rear frame member and at front ends thereof by the coupler assembly,
   a rear wheel and axle assembly mounted to the side rails between the front and rear ends thereof, and
   at least one transportation well mounted to and between the side rails and extending below the side rails, the at least one transportation well configured to receive and hold therein while being transported by the semi-trailer at least one circular object,
   wherein the at least one circular object is a tire, and wherein the at least one transportation well comprises at least one tire well configured to hold therein while being transported by the semi-trailer the at least one tire in standing position with an axis of rotation of the at least one tire perpendicular to the side rails, and
   wherein the at least one tire well is mounted to the side rails between the rear wheel and axle assembly and the rear frame member, and
   further comprising a tire stop member mounted to and between the side rails adjacent to a front end of the at least one tire well, the tire stop member configured to provide a barrier to forward movement of the at least one tire during transport of the at least one tire by the semi-trailer,
   wherein the rear frame member provides a barrier to rearward movement of the at least one tire during transport of the at least one tire by the semi-trailer.

2. The semi-trailer of claim 1 wherein the at least one tire well is mounted to the side rails between the coupler assembly and the rear wheel and axle assembly.

3. The semi-trailer of claim 2 further comprising:
   a first tire stop member mounted to and between the side rails adjacent to a front end of the at least one tire well, the first tire stop member configured to provide a barrier to forward movement of the at least one tire during transport of the at least one tire by the semi-trailer, and
   a second tire stop member mounted to and between the side rails adjacent to a rear end of the at least one tire well, the second tire stop member configured to provide a barrier to rearward movement of the at least one tire during transport of the at least one tire by the semi-trailer.

4. The semi-trailer of claim 1 wherein the at least one tire well comprises:
   a first tire well mounted to the side rails between the coupler assembly and the rear wheel and axle assembly, the first tire well configured to receive and hold therein while being transported by the semi-trailer at least one tire, and
   a second tire well mounted to the side rails between the first tire well and the rear wheel and axle assembly, the second tire well configured to receive and hold therein while being transported by the semi-trailer at least one other tire.

5. The semi-trailer of claim 4 further comprising:
   a first tire stop member mounted to and between the side rails adjacent to a front end of the first tire well, the first tire stop member configured to provide a barrier to forward movement of the at least one tire during transport of the at least one tire by the semi-trailer,
   a second tire stop member mounted to and between the side rails adjacent to a rear end of the second tire well, the second tire stop member configured to provide a barrier to rearward movement of the at least one other tire during transport of the at least one other tire by the semi-trailer, and
   a third tire stop member mounted to and between the side rails adjacent to a rear end of the first tire well and a front end of the second tire well, the third tire stop member configured to provide a barrier to rearward movement of the at least one tire and a barrier to forward movement of the at least one other tire, during transport of the at least one other tire and the at least one other tire by the semi-trailer.

6. A semi-trailer for transporting circular objects, comprising:
   a coupler assembly configured to be connected to a towing vehicle,
   a rear frame member,
   a pair of side rails joined at rear ends thereof by the rear frame member and at front ends thereof by the coupler assembly,
   a rear wheel and axle assembly mounted to the side rails between the front and rear ends thereof, and
   at least one transportation well mounted to and between the side rails and extending below the side rails, the at least one transportation well configured to receive and hold therein while being transported by the semi-trailer at least one circular object,
   wherein the at least one circular object is a tire, and wherein the at least one transportation well comprises at least one tire well hold therein while being transported by the semi-trailer the at least one tire in standing position with an axis of rotation of the at least one tire perpendicular to the side rails, and
   wherein the rear wheel and axle assembly includes (i) a first portion having a first axle and a first set of tires coupled to the first axle, and (ii) a second portion having a second axle and a second set of tires coupled to the first axle, wherein the first and second portions are spaced-apart from each other such that the at least one tire well is mounted to the side rails between the first and second portions of the rear wheel and axle assembly.

7. The semi-trailer of claim 1 wherein the at least one tire well is configured to receive and hold a single tire therein.

8. The semi-trailer of claim 1 wherein the at least one tire well is configured to receive and hold a plurality of tires therein.

9. A semi-trailer for transporting circular objects, comprising:
   a coupler assembly configured to be connected to a towing vehicle,
   a rear frame member,
   a pair of side rails joined at rear ends thereof by rear frame member and at front ends thereof by the coupler assembly,
   a rear wheel and axle assembly mounted to the side rails between the front and rear ends thereof, and
   at least one transportation well mounted to and between the side rails and, extending below the side rails, the at least one transportation well to receive and hold therein while being transported by the semi-trailer at least one circular object,
   wherein the at least one circular object is a tire, and wherein the at least one transportation well comprises least one tire well to hold therein while being transported by the semi-trailer the at least one tire position with an axis of rotation of the at least one tire perpendicular to the side rails, and
   wherein the at least one tire well comprises first and second lateral tire support members extending across the at least one tire well with a space defined between the first and second lateral tire support members that is sized to receive a treaded surface of the at least one tire therein such that a portion of the treaded surface of the tire extends below the first and second lateral tire support members.

10. The semi-trailer of claim 9 wherein at least one of the first and second lateral tire support members is movably mounted to the at least one tire well such that the size of the space defined between the first and second lateral support members is adjustable to accommodate different tire diameters.

11. The semi-trailer of claim 1 wherein the at least one circular object is a truncated circular object having a circular cross-section,
   and wherein the at least one transportation well is configured to hold therein while being transported by the semi-trailer the at least one truncated circular object with a circular cross-section in standing position with an axis of rotation of the at least one truncated circular object having a circular cross-section perpendicular to the side rails.

12. The semi-trailer of claim 11 wherein the at least one truncated circular object having a circular cross-section comprises at least one coiled object,
   and wherein the at least one transportation well is configured to hold therein while being transported by the semi-trailer the at least one coiled object in standing position with an axis of rotation of the at least one coiled object perpendicular to the side rails.

13. The semi-trailer of claim 11 wherein the at least one truncated circular object having a circular cross-section comprises at least one rolled object,
   and wherein the at least one transportation well is configured to hold therein while being transported by the semi-trailer the at least one rolled object in standing position with an axis of rotation of the at least one rolled object perpendicular to the side rails.

14. The semi-trailer of claim 11 wherein the at least one transportation well is configured to receive and hold a single truncated circular object having a circular cross-section therein.

15. The semi-trailer of claim 11 wherein the at least one transportation well is configured to receive and hold a plurality of truncated circular objects having circular cross-section therein.

16. The semi-trailer of claim 1 wherein the at least one transportation well is mounted to the side rails between the coupler assembly and the rear wheel and axle assembly.

17. The semi-trailer of claim 1 wherein the at least one transportation well is mounted to the side rails between the rear wheel and axle assembly and the rear frame member.

18. A semi-trailer for transporting circular objects, comprising:
   a coupler assembly configured to be connected to a towing vehicle,
   a rear frame member,
   a pair of side rails joined at rear ends thereof by the rear frame member and at front ends thereof by the coupler assembly,
   a rear wheel and axle assembly mounted to the side rails between the front and rear ends thereof, and
   at least one transportation well mounted to and between the side rails and extending below the side rails, the at least one transportation well configured to receive and hold therein while being transported by the semi-trailer at least one circular object,
   wherein the rear wheel and axle assembly includes (i) a first portion having a first axle and a first set of tires coupled to the first axle, and (ii) a second portion having a second axle and a second set of tires coupled to the first axle, wherein the first and second portions are spaced-apart from each other such that the at least one transportation well is mounted to the side rails between the first and second portions of the rear wheel and axle assembly.

19. A semi-trailer for transporting circular objects, comprising:
   a coupler assembly configured to be connected to a towing vehicle,
   a rear frame member,
   a pair of side rails jointed at rear ends thereof by the rear frame member and at front ends thereof by the coupler assembly,
   a rear wheel and axle assembly mounted to the side rails between the front and rear ends thereof, the rear wheel and axle assembly including (i) a first portion having a first axle and a first set of tires coupled to the first axle, and (ii) a second portion having a second axle and a second set of tires coupled to the first axle, wherein the first and second portions are spaced-apart from each other, and
   a first transportation well mounted to and between the side rails and extending below the side rails, the first transportation well configured to receive and hold therein while being transported by the semi-trailer a first circular object, wherein the first transportation well is positioned between the first and second portions of the rear wheel and axle assembly.

20. The semi-trailer of claim 19 wherein the first transportation well is configured to receive and hold a single circular object therein.

21. The semi-trailer of claim 19 wherein the first transportation well is configured to receive and hold a plurality of circular objects therein.

22. The semi-trailer of claim 19 further comprising a second transportation well mounted to the side rails between the coupler assembly and the first portion of the rear wheel and axle assembly, the second transportation well configured to receive and hold therein while being transported by the semi-trailer a second circular object.

23. The semi-trailer of claim 22 further comprising a third transportation well mounted to the side rails between the second transportation well and the first portion of the rear wheel and axle assembly, the third transportation well configured to receive and hold therein while being transported by the semi-trailer a third circular object.

24. The semi-trailer of claim 22 further comprising:
   first, second, third, and fourth transportation stop members spaced-apart from each other and each mounted to and between the side rails of the semi-trailer,
   the first transportation stop member configured to provide a barrier to forward movement of the second circular object during transport of the second circular object by the semi-trailer,
   the second transportation stop member configured (i) to provide a barrier to rearward movement of the second circular object, and (ii) to provide a barrier to forward movement of the third circular object during transport of the second and third circular objects by the semi-trailer,
   the third transportation stop member configured (i) to provide a barrier to rearward movement of the third circular object, and (ii) to provide a barrier to forward movement of the first circular object during transport of the third and first circular objects by the semi-trailer, and
   the fourth transportation stop member configured to provide a barrier to rearward movement of the first circular object during transport of the first circular object by the semi-trailer.

25. A semi-trailer for transporting circular objects, comprising:
   a coupler assembly configured to be connected to a towing vehicle,
   a rear frame member, a pair of side rails jointed at rear ends thereof by the rear frame member and at front ends thereof by the coupler assembly,
   a rear wheel and axle assembly mounted to the side rails between the front and rear ends thereof,
   a first tire well mounted to and between the side rails and extending below the side rails, the first tire well configured to receive and hold therein a first tire in standing position with an axis of rotation of the first tire perpendicular to the side rails,
   a second tire well mounted to and between the side rails and extending below the side rails, the second tire well configured to receive and hold therein a second tire in standing position with an axis of rotation of the second tire perpendicular to the side rails, and
   a third tire well mounted to and between the side rails and extending below the side rails, the third tire well configured to receive and hold therein a third tire in standing position with an axis of rotation of the third tire perpendicular to the side rails,
   wherein the rear frame member provides a barrier to rearward movement of the third tire during transport of the third tire by the semi-trailer.

26. The semi-trailer of claim 25 wherein the first and second tire wells are positioned between the coupler assembly and the rear wheel and axle assembly, and wherein the third tire well is positioned between the rear wheel and axle assembly and the rear frame member.

27. The semi-trailer of claim 26 wherein a length of the semi-trailer between the coupler assembly and the rear frame member is approximately 53 feet.

28. The semi-trailer of claim 25 wherein the first and second tire wells are positioned between the coupler assembly and a first portion of the rear wheel and axle assembly, and wherein the third tire well is positioned between the first portion of the rear wheel and axle assembly and a second portion of the rear wheel and axle assembly.

29. The semi-trailer of claim 26 wherein a length of the semi-trailer between the coupler assembly and the rear frame member is approximately 48 feet.

30. The semi-trailer of claim 28, wherein the second portion of the rear wheel and axle assembly is coupled to the rear frame member.

* * * * *